United States Patent
Clark et al.

[15] 3,662,775
[45] May 16, 1972

[54] VERTICAL LOOPER WHEEL FOR IRRIGATION HOSE

[72] Inventors: Warren R. Clark, Box 323, Eastville, Va. 23347; Warren G. Clark, Box 215, Cheriton, Va. 23316; Page N. Scott, R.F.D., Cape Charles, Va. 23310

[22] Filed: Dec. 7, 1970

[21] Appl. No.: 95,654

[52] U.S. Cl. ............................................137/344, 239/212
[51] Int. Cl. ....................................B05b 9/02, E01h 3/02
[58] Field of Search .................137/344; 239/212, 213, 181, 239/183, 189

[56] References Cited

UNITED STATES PATENTS

| | | | |
|---|---|---|---|
| 1,714,713 | 5/1929 | Farley | 239/189 |
| 1,919,703 | 7/1933 | Nielsen | 239/183 |
| 2,751,249 | 6/1956 | Olson et al. | 239/189 |
| 2,801,132 | 7/1957 | Shuck | 239/189 |
| 3,093,312 | 6/1963 | Johnson | 239/189 X |
| 3,101,903 | 8/1963 | Hall | 239/183 |
| 3,477,643 | 11/1969 | Bruninga | 239/189 X |
| 3,489,352 | 1/1970 | Diggs | 239/189 |
| 3,507,336 | 4/1970 | Nelson | 239/183 X |
| 3,515,350 | 6/1970 | Kruse et al. | 239/189 |
| 3,583,636 | 6/1971 | Lacey | 239/189 |

*Primary Examiner*—Samuel Scott
*Attorney*—Kimmel, Crowell & Weaver

[57] ABSTRACT

A traveling looper wheel for vertically lifting and reverting field hose connected with and towed by conventional mobile field water sprinkling means providing field irrigation, the looper wheel preventing damage to planted crops.

10 Claims, 9 Drawing Figures

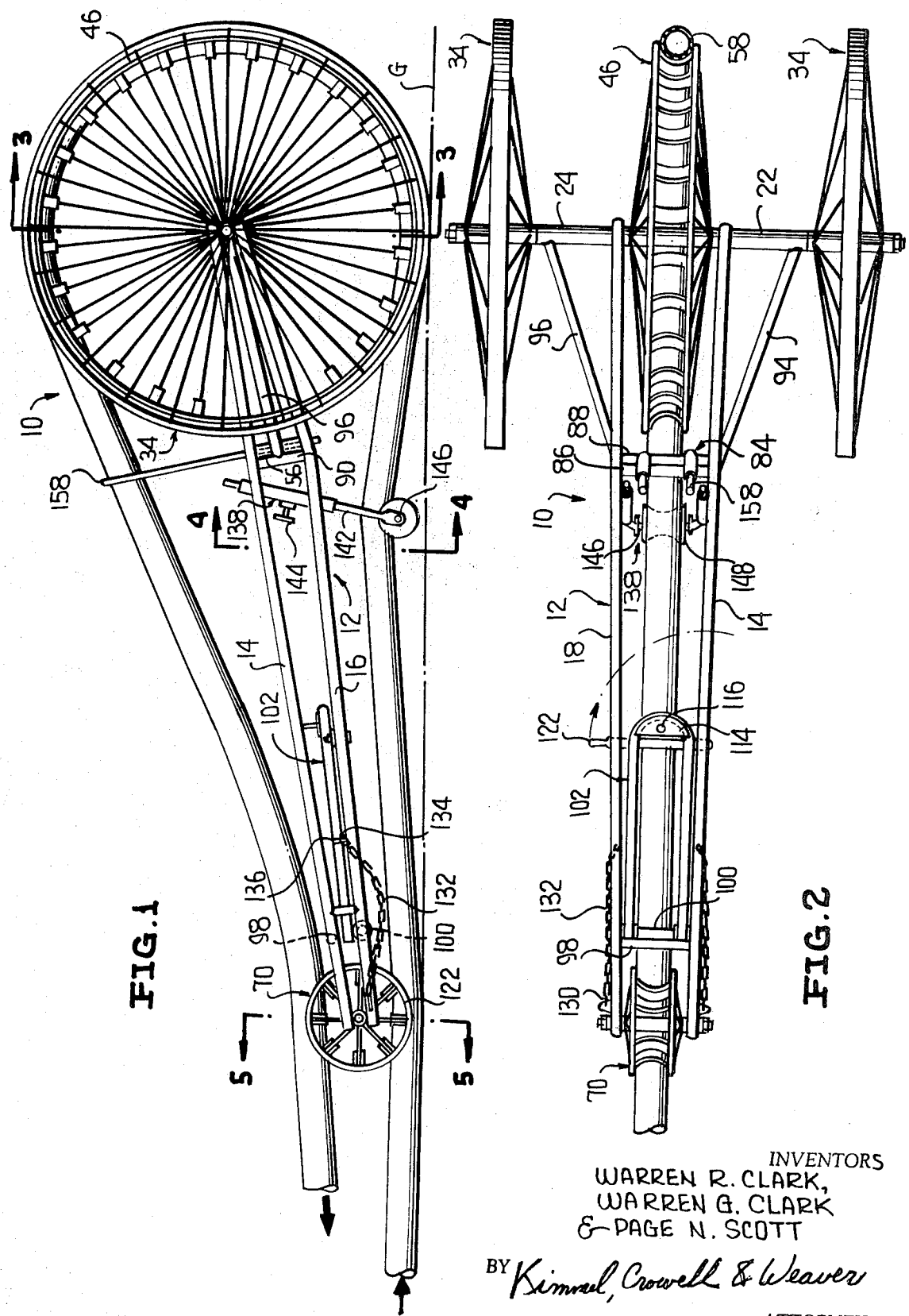

Patented May 16, 1972

INVENTORS
WARREN R. CLARK,
WARREN G. CLARK
& PAGE N. SCOTT
BY Kimmel, Crowell & Weaver
ATTORNEYS

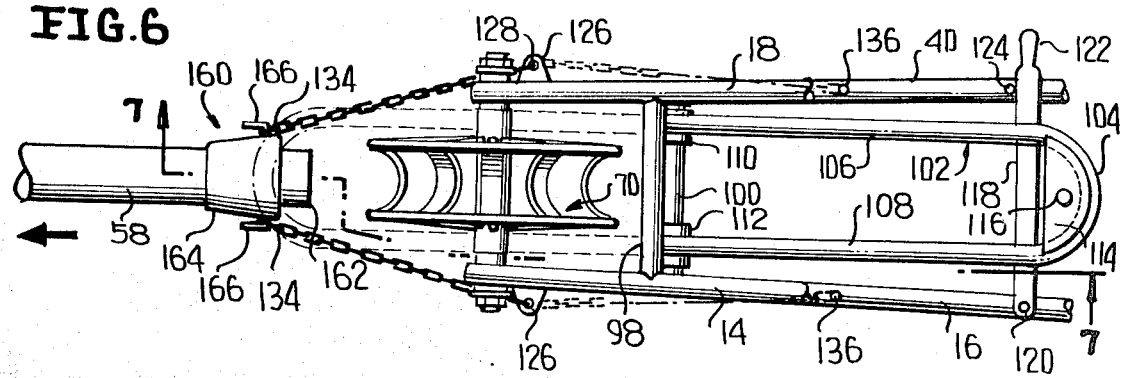
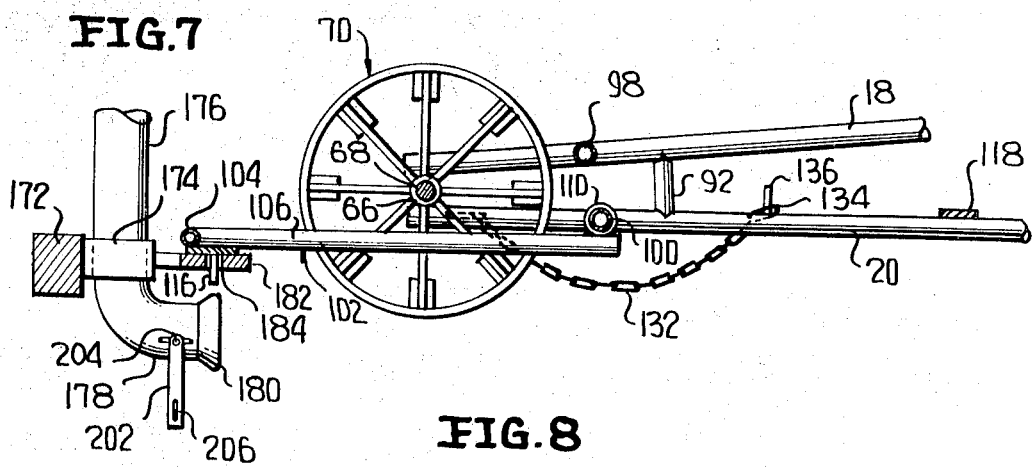
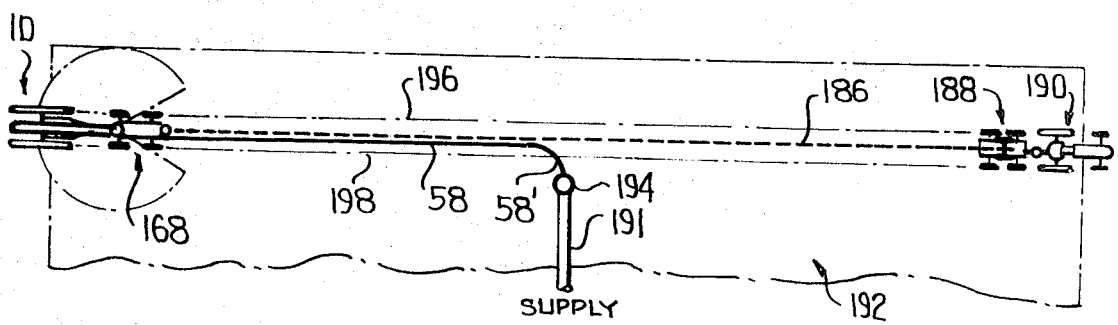
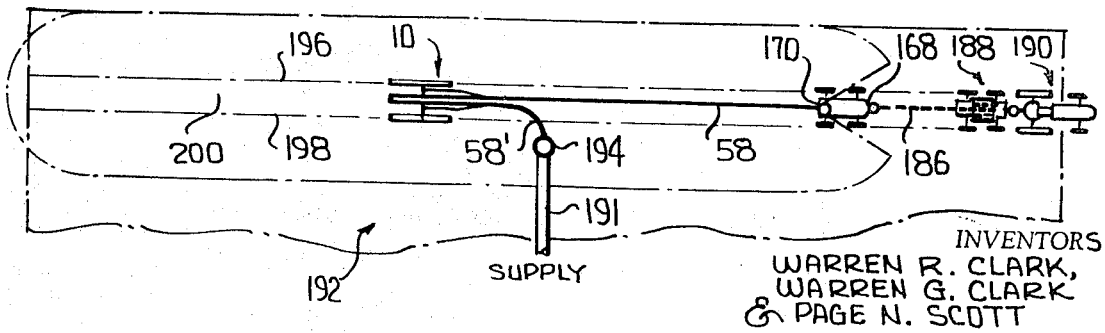

VERTICAL LOOPER WHEEL FOR IRRIGATION HOSE

BACKGROUND OF THE INVENTION

1. Field of the Invention

This invention relates to fluid sprinkling, spraying and diffusing and, more particularly, to means for handling field hose during an irrigation operation.

Description of the Prior Art

There has long existed the problem of economically sprinkling large areas planted with agricultural crops. Irrigation systems and apparatus for irrigating large farm areas are known in the art as, for example, the teachings of William H. Shinn, U. S. Pat. No. 628,127, entitled "SURFACE-IRRIGATING SYSTEM FOR SPRINKLING FARM-LANDS, ROADS OR STREETS". Modern apparatus has been patented by F. V. Kruse et al, U. S. Pat. No. 3,515,350 entitled "WATER IRRIGATION SYSTEM", the patent having issued on June 2, 1970. This last mentioned patent is assigned to AG-RAIN, INCORPORATED, Havana, Illinois, which manufactures and sells the apparatus under the trade name "WATER WINCH", brochures concerning the same being available on request. To the extent necessary, the disclosures of this patent and brochures are incorporated by reference herein. But with the development of irrigation systems capable of watering vast area of farm land, the flexible conduits or hose connecting the watering sprinkler or apparatus with a water supply conduit developed many serious problems, and it is to the solution of these that this invention is directed.

In the use of conventional equipment such as, for example, the equipment developed by Kruse et al, the irrigation hose is normally dragged behind the sprinkler forming a transversely extending horizontal loop. Thus, no crops may be planted in that field area which would be swept by the trailing field hose. To accommodate the trailing field hose and the sprinkling equipment, roads or lanes are generally laid out in the field. The hose used with the Kruse et al apparatus is 4 inch ID, and its contemplated effective length is 660 feet. This sprinkling apparatus and its attendant hose requires that a lane or road 12 feet wide be formed in the field to be irrigated at spacings of 330 feet in order to make efficient use of the equipment, and since the water supply line is disposed in mid-field, the apparatus will travel a total of 1,320 feet during the course of one continuous sprinkling operation. Each road or lane formed in the farm land thus represents a loss of cultivatable land in the amount of 15,840 square feet.

Efforts to avoid and prevent the horizontal sweep of the dragging hose have been made, aside and apart from those of the applicants, and an example of this may be found in the patent to F. B. Allen et al, U.S. Pat. No. 3,241,769, entitled "LOW PRESSURE SPRINKLING SYSTEM". These patentees provide a framework type of wheeled carriage which is extended along a side of a field to be watered, the framework being adapted to receive and support the irrigation hose axially throughout its length as the same reaches the end of a given run for the sprinkling apparatus. The patentees suggest a carriage length of up to one-half the length of the employed hose, and this would entail a carriage of up to 330 feet in length if used in the system contemplated by the applicants.

The disclosure of this patent becomes even less germane when it is understood that the patentees did not contemplate using the carriage in tandem with a field irrigation device as is envisioned by the applicants.

Winding drums or reels for irrigation hose are not, per se, new in the art as is shown in the patent to Viggo Nielsen, U.S. Pat. No. 1,919,703, entitled "APPARATUS FOR WATERING OR SPRAYING GARDENS AND THE LIKE", but the problem solved by this patentee is not that of the applicants, and reference thereto is made merely by way of interest.

SUMMARY OF THE INVENTION

One of the primary objects of this invention is to provide a field hose looper wheel for lifting and reverting field hose, the latter being connected to and pulled by a mobile automated sprinkler device, out of ground engagement as a field irrigation operation is carried out, the looper wheel eliminating and preventing crop damage occasioned by the usual ground engaging horizontal loop normally formed in field hose connected to conventional field crop irrigation or sprinkling means, and to eliminate the necessity of leaving roadways in planted fields whereby greater acreage is made available for farming.

In connection with the above object, it is further proposed that the device according to this invention becomes operative as the field hose is moved by the irrigating machine.

Another object of this invention is to provide a device of the type to which reference has been generally made above, the device being non-complex in construction and assembly, inexpensive to manufacture and maintain, and which is rugged and durable in use.

Other and further objects and advantages of the instant invention will become more manifest from a consideration of the following specification when read in the light of the annexed drawings.

BRIEF DESCRIPTION OF THE DRAWINGS

FIG. 1 is a side elevational view of an agricultural accessory, machine, or device, in the nature of a field hose looper wheel, the wheel being constructed in accordance with this invention, this Figure illustrating the looper wheel in an operative position with the irrigation hose or conduit connected thereon;

FIG. 2 is a top plan view of the looper wheel shown in FIG. 1, the hose having been partially removed therefrom;

FIG. 6 is a fragmentary detail top plan view illustrating details of the transporting hitch assembly in its inoperative position, the pivot for the transporting hitch, and their association with the main frame, this view also illustrating the flexible chain connection between the front end of the looper frame assembly and the trailing end of the field hose, the connection being utilized in drawing the looper wheel from the field at the conclusion of one irrigation operation made by the irrigation device or sprinkler;

FIG. 7 is a detail cross-sectional view, this view being taken substantially on the vertical plane of line 7—7 of FIG. 6, looking in the direction of the arrows, this Figure illustrating the transporting hitch arm assembly in its operative position on the irrigation sprinkler following disconnection of the looper wheel from the field hose;

FIG. 8 is a schematic illustration illustrating the relative positions of the field hose looper wheel, irrigation device or sprinkler, field hose reel and tractor at the beginning of one irrigation run through a planted field; and FIG. 8A is a schematic illustration showing the positions of the apparatus of FIG. 8 at the end of the irrigation operation.

DESCRIPTION OF THE PREFERRED EMBODIMENT

Figure 3:
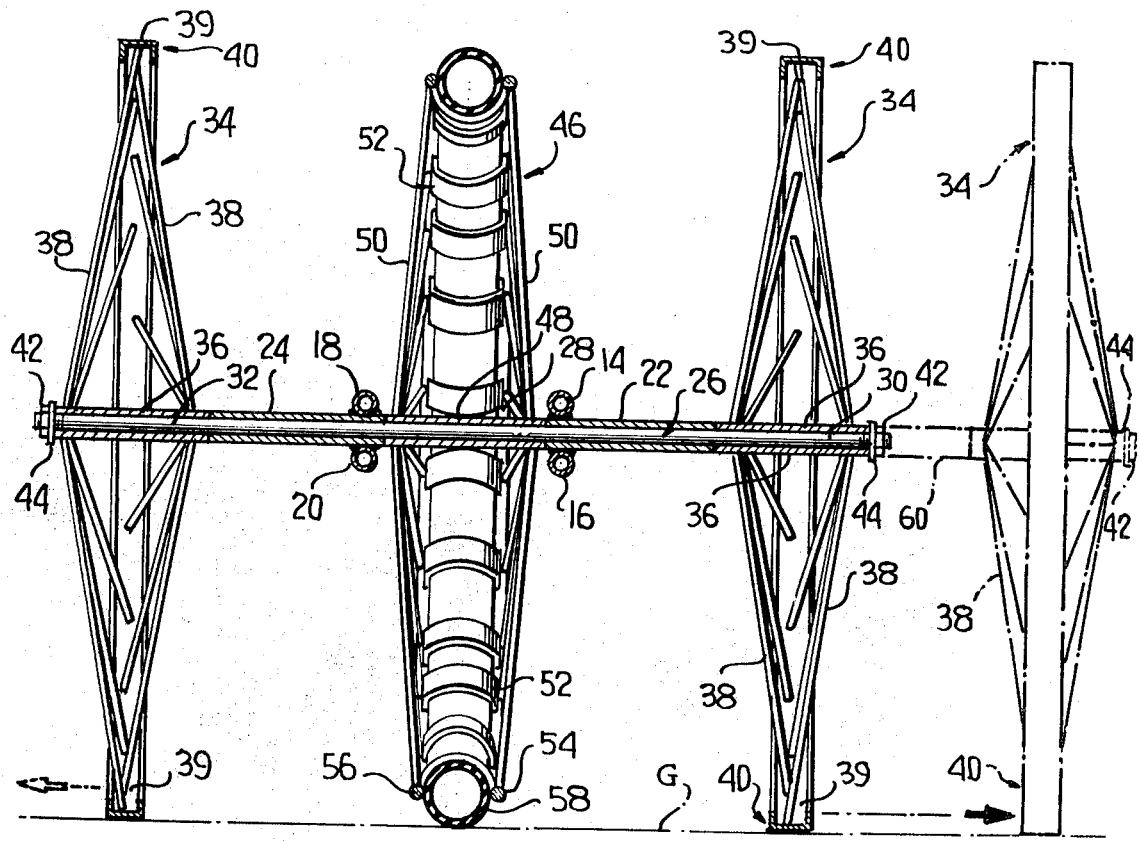
FIG. 3 is a detail transverse cross-sectional view, FIG. 3 being taken on the vertical plane of line 3—3 of FIG. 1, looking in the direction of the arrows, this Figure showing construction details which enable the accessory to be used when the spacing between planted rows changes.

Referring now more specifically to the drawings, reference numeral 10 designates, in general, an agricultural irrigation accessory, machine, or device, in the nature of a field hose looper wheel assembly, the wheel assembly being constructed in accordance with the teachings of this invention. The looper wheel assembly 10 includes a wheel supported main frame 12 (see FIGS. 1 and 2) which comprises a pair of vertically spaced hollow tubular side frame members 14, 16 at one side thereof, and a similar pair of side frame members 18, 20 at its opposite side. The trailing ends of each pair of vertically spaced side frame members 14, 16 and 18, 20, respectively, converge towards one another and are fixedly connected by conventional means (welding, for example) with one of the ends of a pair of stationary hollow tubular axle housings 22, 24. Extending through the axle housings 22, 24 is a substantially solid cylindrical elongated axle 26. The elongated axle housings 22, 24 have adjacent ends spaced from one another longitudinally with respect to the axle 26 providing an unhoused central axle portion 28. The axle 26 is of such length as to provide end portions 30, 32 which project beyond the remotely disposed ends of the axle housings 22, 24.

Reference numerals 34 each denotes a pair of identically constructed ground engaging wheels of appreciable diameter. Each wheel 34 includes a centrally located normally horizontal hollow tubular elongated cylindrical hub 36 from the opposed ends of which project a plurality of elongated substantially solid cylindrical spokes 38 having their respective outer ends fixedly connected, by conventional means (not shown), to the inner side of a tire 40. The outer sides of the bights 39 of the tires 40 are adapted to make contact with the ground G (see FIGS. 1 and 3). The hubs 36 of the two ground engaging wheels 34 are telescoped over the projecting end portions 30, 32 of the axle 26 and are secured for rotation thereon by means of the conventional nut and washer assemblies 42, 44.

Reference numeral 46 designates, in general, a field hose looper wheel constructed in accordance with this invention. As is seen in the several Figures of the drawings, the wheel 46 includes a centrally elongated substantially hollow cylindrical tubular hub 48 which is rotatably mounted on the central axle portion 28. A plurality of spokes 50 have one of their ends connected to the remotely disposed ends of the hub 48, and their other respective ends converge inwardly towards one another for fixed connection with the outer edges of the concave sides of a plurality of circumferentially spaced concave-convex field hose engageable shoes 52. The shoes 52 open outwardly with respect to the wheel 46, and the opposed ends of each shoe 52 are fixedly secured by conventional means (not shown) to a cylindrical circular rim 54, 56, respectively. As is clearly shown in FIGS. 3 and 5, the inside radius of curvature of each of the shoes 52 is substantially equal to the outer radius of curvature of a section of hollow cylindrical field hose 58, when the hose is under water pressure, and with which the shoes 52 are adapted to engage.

Realizing that the spacing between rows of agricultural crops may vary from field to field, this invention contemplates the use of axles 26 of greater length and spacers 60 of selected lengths whereby the spacing of the ground engaging wheels 34 relative to the wheel 46 may be changed, all in the manner as suggested by the arrows in FIG. 3 of the drawings.

Figure 5:
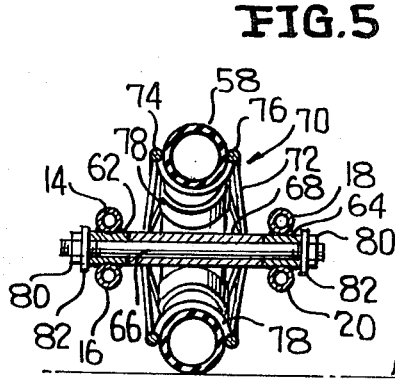
FIG. 5 is a fragmentary detail cross-sectional view, FIG. 5 being taken substantially on the vertical plane of line 5—5 of FIG. 1, looking in the direction of the arrows.

Referring now more specifically to FIGS. 1, 2 and 5, it is seen that the leading ends of the side frame members 14, 16 converge towards one another and that the leading ends of the side frame member 18, 20 at the opposed side of the main frame 12 also converge towards one another. The converging ends of the pairs of side frame members 14, 16, and 18, 20 are fixedly connected by conventional means (welding, for example) to a pair of substantially hollow cylindrical sleeves 62, 64, respectively. As is seen in Figure 5 of the drawings, the sleeves 62, 64 receive therethrough the opposed ends of an elongated second axle 66 and are longitudinally spaced from one another with respect to its longitudinal axis.

Rotatably supported on the axle 66 between the sleeves 62, 64 is the hub 68 of a field hose tracking wheel 70. In addition to the centrally located hub 68, the field hose tracking wheel 70 also includes a plurality of spokes 72 having one of their respective ends fixedly connected to the hub 68, and their other ends fixedly connected to a pair of laterally spaced substantially cylindrical circular rims 74, 76. The opposed ends of a plurality of concave-convex field hose engageable shoes 78 are fixedly secured, respectively, to the cylindrical rims 74, 76. These shoes 78 open outwardly with respect to the wheel 70 and the concave sides thereof are adapted to be engaged by portions of the field hose 58 in the manner to be described below. The wheel 70 and the sleeves 62, 64 are held in assembly by the customary nuts 80 and washers 82 threadedly engaged, respectively, on each end of the axle 66. It should be noted that the inner radius of curvature of each of the shoes 78 is also substantially equal to the outer radius of curvature of the field hose 58 when the latter is under water pressure.

The main frame 12 includes bracing and spacing means comprising an open substantially hollow tubular rectangular frame 84 having a normally horizontal upper frame member 86 (see FIG. 2) which extends between and is rigidly secured to confronting portions of the upper frame members 14, 18, a lower frame member 88 extending between and fixedly secured to confronting portions of the lower side frame members 16, 20 and oppositely disposed upright brace members 90, 92 which extend between each of the vertically spaced side frame members 14, 16 and 18, 20, respectively, and are rigidly connected thereto immediately adjacent the ends of the upper and lower brace members 86, 88. One of the ends of a pair of struts 94, 96 is fixedly secured, respectively, to the upright brace members 90, 92, and their respective other ends diverge away from one another for fixed connection with the stationary axle housings 22, 24, respectively.

The main frame bracing means further includes a strut 98 which extends transversely between the upper side frame members 14, 18 adjacent the leading ends thereof and which is fixedly secured thereto. A similar hollow tubular and cylindrical strut 100 extends between and is fixedly secured to the lower side frame members 16, 18 and serves as the pivot means for a transporting hitch assembly generally indicated by the reference numeral 102.

The hitch assembly 102 comprises a substantially U-shaped member having an arcuate bight portion 104 from the opposed ends of which longitudinally project, respectively, arms 106, 108. The bight 104, and the arms 106, 108 are formed of a hollow tubular material and, each arm, at its outermost terminal end is fixedly connected to a collar 110, 112, respectively. As is seen in the several Figures of the drawings, the collars 110, 112 are telescoped over the cylindrical strut 100, and are pivotally mounted adjacent each end thereof.

Fixedly secured to and spanning across the bight portion 104 is a chord shaped plate 114 from which normally upwardly projects a substantially solid connector pin 116 when the transporting hitch assembly 102 is in its inoperative position shown in FIG. 6. The hitch assembly 102 is adapted to turn through an arc of at least 180° clockwise from its inoperative position shown in FIGS. 1 and 6 to its operative transport position illustrated in FIG. 7. The clockwise movement of the hitch assembly normally is prevented by an abutment lever 118 which extends across the path of movement of the arms 106, 108 in a clockwise direction, being interposed between the arms 106, 108 and the frame members 16, 18. As is seen in the drawings, one end of the lever 118 has one of its ends pivotally connected on the lower side frame member 16 on pivot pin 120, and its other end extends transversely across the opposite side frame member 20 to terminate in a handle 122. Pivotal movement of the lever 118 in a clockwise direction, reference being made to FIG. 6 of the drawings is limited by a stop pin 124 secured on the lower side frame member 20. When the hitch assembly 102 is in its operative or transport position shown in FIG. 7, the lever 118 may be pivoted clockwise about its pivot pin 120 in the direction of the arrow shown in FIG. 2 to become superimposed above the side frame member 16 enabling the assembly to pivot from its position of FIG. 6 to that of FIG. 7.

To serve a function to be described infra, the leading ends of each of the lower side frame members 16, 20 are each provided with a laterally projecting lug 126 apertured at 128 to receive an end link 130 of each of a pair of chains 132. The chains 132 serve a function to be described below, and their other terminal links 134 are adapted to be releasably engaged on upwardly projecting pins 136 when the chains are in their inoperative positions.

Figure 4:
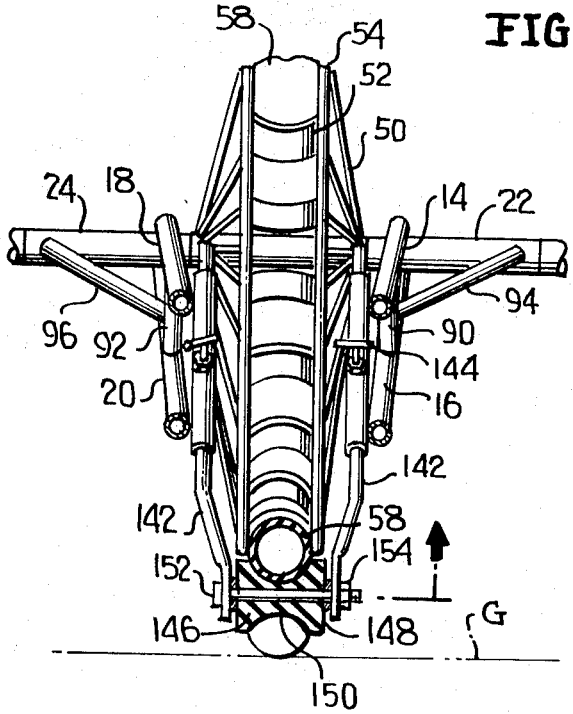
FIG. 4 is a fragmentary detail cross-sectional view, this Figure being taken substantially on the vertical plane of line 4—4 of FIG. 1, looking in the direction of the arrows, the upright field hose guides having been omitted in the interest of clarity.

Reference numeral 138 generally indicates (see FIGS. 1 and 2) a sub-assembly frame supported on the main frame 12. The sub-assembly frame includes a pair of identically constructed substantially hollow tubular guide sleeves 140 which extend transversely across, respectively, the pairs of side frame members 14, 16 and 18, 20 in laterally spaced and substantially parallel relationship relative to one another. Conventional means are used to effect the affixing of the guide sleeve 140 to their respective associated side frame members, and each of the guide sleeves telescopically receives an elongated substantially cylindrical rod 142 therein which may be held in a preselected adjusted position as by means of the wing bolts 144. The lower ends of the rods 142 support the opposed ends of a transversely extending shaft 146 therebetween, and the latter, in turn, rotatably supports a roller 148 (see FIG. 4) having a concave surface 150 struck on a radius of curvature substantially equal to the outside diameter of the hose 58 under pressure. The shaft 146 may be headed at 152 and secured on the lower ends of the rod 142 as by means of a conventional nut 154. The function of the roller 148 will be described below.

Reference numerals 156 each denote an elongated substantially hollow socket having opposed upper and closed lower ends. The sockets 156 extend transversely across the upper and lower brace members 86, 88 to which they are secured in longitudinally spaced relationship relative thereto. The sockets 156 each releasably receive the lower ends of a hose guide rod 158, respectively.

This completes the description of the construction of the looper wheel assembly 10, per se. Since its use, however, requires an association with other conventional equipment normally employed in an agricultural irrigation operation, a brief description of such equipment and cycle of operation is related below. In reading further, it will be understood that no claim is made herein to the irrigation method nor to the described equipment since the same may vary according to circumstances.

The field hose 58 is of conventional construction and terminates, at each end, in conventional couplers 160 (see FIG. 6). Each coupler 160 includes a male component 162 and a sheath 164. Projecting laterally from diametrically opposed sides of each sheath 164 are inwardly extending substantially L-shaped connector lugs 166.

At 168 is schematically indicated a conventional wheeled irrigation machine (see FIGS. 8 and 8A) having a water gun or nozzle 170. This machine may comprise the "Water-Winch" to which reference has been made above. The machine 168 includes a suitable frame 172 to the rear of which is secured, by bracket means 174, a riser pipe 176 for conducting water under pressure to the gun or nozzle 170. The lower end of the riser pipe 176 is laterally offset rearwardly as at 178 and terminates in a female component 180 for the reception of the other male hose coupler component 162. In FIG. 7, the frame 172 is shown as including a rearwardly positioned cross-frame member 182 having a transverse opening at 184 to receive the connector pin 116 when the hitch assembly 102 is turned from its inoperative position of FIG. 6 to its operative position of FIG. 7 to form a function to be described. The irrigation machine 168 also includes a power driven winch (not shown) for a cable 186 (see FIGS. 8 and 8A).

Reference numeral 188 denotes a conventional wheeled field hose reel which may be of the type manufactured by AG-RAIN, INC., Havana, Illinois, model NF600, brochures being available upon request. This reel is designed to handle 660 feet of 4 inch field hose herein bearing the reference numeral 58, and the structure of the field hose reel 188 is herein incorporated by reference. Such reels are provided with a power take-off drive means (not shown) which are adapted to be releasably connected to the power take-off of a conventional wheeled farm tractor such as is schematically illustrated at 190 in FIGS. 8 and 8A.

At 191 is indicated a main water supply conduit which normally extends transversely across a field 192 under cultivation, the conduit normally being positioned at substantially mid-center between the ends of the field. It will be understood that the conduit 191 is connected with a source of water supply and pump means (not shown) for delivering water to the gun or sprinkler means 170 at, substantially, 85-100 psi. The conduit 191 is provided with a combined valve and coupler unit 194, the coupler means of the unit being adapted to releasably receive one of the couplers 160. Since neither the valve nor the coupler means 194 form any part of the instant invention, no further detailed description of the same will be offered at this time.

At the start of the irrigation operation the field hose reel 188 is connected, by conventional means, to the back end of the tractor 190. The back end of the field hose reel 188 is connected, again by conventional means, to the front end of the traveling irrigation or sprinkler machine 168, and the front end of the looper wheel assembly 10 is connected by the hitch means 102 (see FIG. 7) to the back end of the traveling irrigation machine 168, all in the manner shown in FIG. 7. Any conventional means (not shown) may be utilized to connect the hose reel 188 with the tractor 190, and for connecting the traveling irrigation or sprinkler machine 168 with the hose reel 188. Such means form no part of the instant invention.

The connected components are now driven along an end of the field 192 (see FIGS. 8 and 8A) and are turned laterally into the field 192. In turning into the field 192, the wheels of the several connected components will track in the pathways 196, 198 provided in the normal spacing between the rows of planted crops (not shown), with the vertical looper wheel 46 being normally aligned with a third pathway 200.

The usage of the term "pathway" is not to be confused with the expression "lane" or "roadway" for the latter expressions are generally understood to constitute conventional clearings through a field wherein the width of the lane or roadway is substantially 10 to 12 feet wide, this being necessary in order to accommodate the usual conventional irrigation equipment. By the expression "pathway" reference is made only to that spacing which is ordinarily made between planted crop rows to insure their proper growth without interference, one with the other, and without in any way expressly reserving a "lane" or "roadway" through a field which would normally accommodate the usual tractor, cable winch, hose reel, irrigation machine and its associated field hose. To make such a reservation of field space would defeat one of the primary objects of this invention as noted above. In the practice of the conventional irrigation of a field, and as is practiced in the course of this invention, the connected wheeled vehicles, when turned laterally into the field, will span two or more planted rows of crops with the looper wheel 46 being aligned with the intermediate pathway 200.

After entering the field 192, the looper assembly hitch 102 is disconnected from the irrigation machine 168, and the hitch assembly 102 is then returned from its position shown in FIG. 7 to that of FIG. 6.

The brake on the hose reel 188 is released, and the connected irrigation machine 168, hose reel 188 and tractor 200 are then moved a distance of approximately 60 feet towards the other end of the field, the field hose 58 being payed off the reel 188 during this course of travel and being deposited in the pathway 200. The hose 58, during this course of travel, will pay off beneath the irrigation machine 168. All connected units are then halted.

Thereafter, the looper wheel assembly 10 is pushed in the direction of the adjacent end of the field hose 58 to cause its tracking wheel 70 to engage and ride over the free end of the payed out portion of the field hose 58. This end of the field hose 58 is then threaded over the roller 148, under the looper wheel 46, and is trained about its rear and upper portions for extension and support forwardly and across the upper side of the tracking wheel 70 and to the coupler 180 of the irrigation machine 168 with which this end of the coupler 160 will mate.

The extension or offset portion 178 of the riser pipe 176 is provided with opposed elongated levers 202 (only one being shown, see FIG. 7) which are pivoted at 204 at one of their respective ends to enable the other free ends thereof to be swung counter-clockwise (reference being again made to FIG. 7) in order to align the slots 206 with the adjacent lugs 166 to effect the completion of the coupling. The levers 202 may be possessed with a degree of resiliency, if necessary, to permit this coupling to be effected.

The cable brake (not shown) of the cable winch on the sprinkler or irrigation machine 168 is now released and the free end of the cable 186 is connected to suitable means (not shown) on the tractor 190. The hose reel 188 is now disconnected from the irrigation machine 168, and the tractor 190 together with its connected hose reel 188 is driven to, substantially, mid-field, and in the course of this movement, the remainder of the 660 feet of the field hose 58 is payed off therebehind.

At mid-field the other end of the field hose 58 will be coupled to the combined valve and coupler means 194 in a smooth transverse curve 58'. The tractor and the connected (now empty) hose reel 188 are now driven to the opposed end of the field. Remembering that the cable 186 is connected to the cable winch on the tractor 190, the cable 186 will also be payed out this distance. The hose reel 188 and the tractor 190 will take their respective positions shown at the right hand side of FIGS. 8 and 8A, the tractor 190 serving as an anchor for the cable 186. The field hose looper wheel assembly 10 and irrigation machine 168 will be in the left hand positions as shown in FIG. 8.

After checking to make certain that no kinks are in the field hose 58 and that the cable 186 is clear thereof, the tractor is braked to hold the same and the connected field hose reel 188 stationary.

The gun or nozzle 170 is now turned in the direction of the looper wheel assembly 10 and the valve means 194 is opened. Any pressure surge in the hose 58 will be translated in a forward movement of the machine 168 in a direction away from the looper wheel assembly 10. Assuming that the surge has passed, the gun or nozzle 170 is now set to irrigate the adjacent end portions of the field 192. Thereafter, the usual control means is set on the irrigation machine 168 causing its nozzle 170 to rotate and to irrigate the field on both sides thereof, all in the conventional manner, and the cable which is now placed in operation.

As the cable winch begins to take up the cable 186, the irrigation machine 168 and the looper assembly 10 begin controlled speed movements towards the tractor 190, the irrigation machine 186 traveling at substantially twice the speed of the looper wheel assembly 10.

It is at this point that attention is called to the fact that the wheel 70 in engaging over a portion of the field hose 68 guides the looper wheel assembly 10 as it travels, and in being engaged under a forwardly extending portion of the field hose 58 serves as hose guide means between the looper wheel assembly 10 and the irrigation machine 168 as the same are winched towards the tractor 190 and the field hose reel 188.

As the winching operation continues, the irrigation machine 168 will approach and will cross over the curved field hose portion 58', there being no problem in effecting this crossing. The irrigation machine 168 continues its forward movement past mid-field and until it reaches a position substantially proximate the hose reel 188 which is, as has been stated above, positioned adjacent the other end of the field. Here automatic controls (not shown) take over to effect the halting of the cable winch and, consequently, the forward movement of the irrigation machine 168. At this point, the looper wheel assembly 10 is substantially at mid-field with the components of the system substantially as shown in FIG. 8A.

For the purpose of emphasis, it is here pointed out that during the course of travel of the irrigation machine 168 from one end of the field to the other, the field irrigation hose 58 is picked up from the pathway 200 and is held in a suspended position between the looper wheel 46 and the irrigation machine 168. That portion of the field hose 58 which extends between the looper wheel assembly 10 and the irrigation machine 168 does not make contact with the ground, and since the wheeled vehicles straddle the crops planted between the pathways 196, 200 and 198, 200, the necessity for providing lanes or roadways for the irrigation equipment is eliminated.

The valve means 194 is now closed and the adjacent coupler 160 is disconnected therefrom. The other coupler 160 is disconnected from the irrigation machine 168. The cable 186 is now disconnected from the tractor 190 and the irrigation machine 168 is now pushed backwardly over the adjacent end of the field hose 58, and this free end of the field hose 58 is now connected on the hose reel 188. Power take-off means of the hose reel 188 is now connected with the tractor power take-off means. The tractor 190 is now started to provide energy for the take-off means, and the hose reel 188 now begins to rotate to take in the hose 58 causing its unconnected end to be drawn over, behind and under the looper wheel 46. This end of the field hose 58 will be also drawn under the roller 148 and wheel 70. As this reeling in operation takes place, care should be exercised to prevent the lugs 166 from becoming tangled with the rods 142 and 158.

After the hose 58 has cleared the tracking wheel 70, the operation of the hose reel 188 is halted. The adjacent coupler 160 is now moved into juxtaposition relative to the tracking wheel 70, and the end links 134 of the chains 132 are now disconnected from their respective pins 136 and are extended forwardly of the tractor wheel 70 to effect connection with the lugs 166. This is the condition illustrated in FIG. 6 of the drawings.

The hose reel 188 is now reactivated and reels in more of the field hose 58, and in so doing, the looper wheel assembly 10 will be drawn from the field 192 in the direction of its other end, that is, in the direction of the hose reel 188 and tractor 190. When the looper wheel assembly 10 has been drawn closely to the irrigation machine 168, the hose reel 188 is shut down and the links 134 are disconnected from the lugs 166 to be returned to their respective pins 136. The hose reel 188 is then again reactivated to reel in the remainder of the field hose 58, after which the operation of the hose reel 188 is halted.

The front end of the main frame 12 is now picked up and moved towards the back or rear end of the irrigation machine 168 after which the lever 118 is turned clockwise from its position shown in FIG. 6 so that it overlies the side frame member 16. This frees the hitch assembly 102 for pivotal movement from its inoperative position of FIG. 6 to its operative position of FIG. 7 wherein the pin 116 is engaged within the opening 184 formed in the cross-frame member 182 of the irrigation machine 188. The connected units are now moved to a new position in the field 192 to repeat the irrigation operation.

The field irrigation steps set forth above are recited merely by way of example and may be varied in sequential order if desired. It should also be understood that the machines or devices specifically mentioned herein may comprise separate units or may be combined, one with the other, it being necessary only to provide separate irrigation machines and vertical field hose looper means.

Having described and illustrated one embodiment of a vertical field hose looper assembly, it will be understood that the same has been offered merely by way of example, and that the scope of this invention is to be limited only by the appended claims.

What is claimed is:

1. In combination, a mobile field irrigation device, a flexible field hose having a first reach connected with a field source of water under pressure, and apparatus for forming an upright elevated reverted second reach for connection with said device, said apparatus comprising:

an elongated main frame having leading and trailing ends;

ground-engaging wheels and means connecting and supporting said main frame on said ground-engaging wheels adjacent its said trailing end;

a field hose wheel and means supporting said field hose wheel for free rotation around a normally horizontal axle, said field hose wheel being disposed adjacent said trailing end of said main frame;

said first reach being extended below said leading and trailing ends of said main frame and said second reach being trained around said field hose wheel and reverted for connection with said device, said reverted second reach being disposed in an elevated position relative to the ground;

a field hose tracking wheel and means supporting said tracking wheel for free rotation around a normally horizontal axle, said tracking wheel being mounted on said main frame adjacent its said leading end; and said tracking wheel engaging over and following said first reach as said device pulls on said second reach causing said main frame to travel substantially parallel to said first reach with said second reach winding on and rotating said field hose wheel in the continuing formation of an upright loop therein.

2. The combination of claim 1 wherein:
continuing portions of said second reach are supported on said tracking wheel.

3. The combination of claim 2 and:
roller means and means connecting said roller means on said main frame between its said leading and trailing ends, said roller means receiving thereover and elevating continuing portions of said first reach for guidance to said field hose wheel.

4. The combination of claim 3 and:
means connected on said main frame intermediate its said ends and extending on opposite sides of said second reach for guiding said second reach towards said tracking wheel.

5. The combination of claim 4 and:
means for connecting said apparatus with said first reach for moving said field hose and said apparatus, simultaneously, from said field.

6. The combination of claim 5 and:
means for transporting said apparatus from one field to another, said last named means including a sub-frame assembly pivotally connected on said main frame and having a bight swingable to a position forward of said leading end of said main frame; and means on said bight for connection with a towing vehicle.

7. The combination of claim 6 wherein:
said first reach is provided with coupling means for effecting connection with said field source of water; and said means for connecting said apparatus with said first reach comprises chain means.

8. The combination of claim 7 wherein:
said ground-engaging wheels and said field hose wheel all include hub means; and said axle for said field hose wheel is common to said hub means.

9. The combination of claim 8 wherein:
said field hose wheel is mounted on said common axle intermediate said ground-engaging wheels.

10. The combination of claim 9 wherein:
the diameter of said field hose wheel is less than the diameters of said ground-engaging wheels.

* * * * *